Patented Aug. 4, 1942

2,291,824

UNITED STATES PATENT OFFICE 2,291,824

RECOVERY OF REFINED PRODUCTS FROM TALL OIL

Isador Miller, New York, N. Y.

No Drawing. Application March 18, 1939, Serial No. 262,637

5 Claims. (Cl. 260—97.5)

This invention relates to improvements in processes for the recovery of fatty and resin acids from the so-called "liquid resin" obtained as by-product in the manufacture of paper pulp from wood by the sulfate process.

In the manufacture of sulfate pulp the alkaline black liquor separated from the pulp can be treated to yield a dark brown or black semi-liquid, which is sticky, thick, viscous and muddy, with a rather strong and unpleasant odor. This is known as "tall oil" or "liquid resin" and consists essentially of a mixture of fatty acids, resin acids and non-saponifiable resinous hydrocarbons. The amount recovered is approximately three percent or more by weight of the wood treated. The exact composition will vary in different mills, but an average composition of material recovered e. g. by southern kraft mills will be about as follows:

|  | Percent |
|---|---|
| Resin acids | 50–60 |
| Fatty acids | 40–30 |
| Non-saponifiables | 10 |

In its crude state the material has rather limited uses; chiefly as a cheap soap base in the preparation of road emulsions, and in the manufacture of core oils, or similar products where its color and inherent odor are least objectionable. Numerous attempts have been made to improve its quality and thus broaden its uses by separation or purification, for example, by distillation, or by conversion of one of the acid constituents to esters. However, commercially only the purification by distillation, has been hitherto found to be practical. As practised in this country, this distillation yields a product of somewhat improved color and odor but which is still of rather limited application. Except for a slight increase in the saponification number there is no appreciable change in the chemical properties. The residues from the distillation are sold as pitch.

The numerous efforts noted to separate the ingredients of tall oil by selective esterification were with the lower monohydric alcohols, or with polyalcohols, even with glycerin. It is well known that the so-called fatty acids will readily react directly with alcohols in the presence of a mineral acid or similar esterifying agent to yield esters of definite composition and definite boiling points at reduced pressures. It is equally well known that resin acids, as abietic, will not form esters under these conditions. These two facts form the basis of the standard quantitative, chemical method, known as Twitchell's method, for the separation and the determination of fatty acids and of resin acids in admixture of the two. Proposals to apply these principles in commercial processes for the separation of the ingredients of tall oil have, however, met with practical failure; first, because the raw material cost was too high, and second (but more important) because the processes suggested have been found impractical from an operating standpoint for the reasons now to be pointed out.

Such esterification process would be practical only in the presence of a relatively large excess of the alcohol or other mutual solvent. Even the use of cheaper solvents does not obviate the necessity for a considerable excess of alcohol as the esterifying agent. From a practical standpoint, the choice of alcohols is very limited; in fact, only methyl and ethyl alcohols are commercially feasible, first, because of cost, and second, because the boiling points of the esters increase as we go higher in the alcohol series which involves added expense and complications in manufacture. Without recovery of the excess alcohol, and the other mutual solvent, if used, the process can hardly be economical; but even if such excess (or solvent) is allowed to go to waste, it must first be separated from the ester complex. Such separation, however, is very difficult and troublesome in this instance because the mixtures of esters and resin acids obtained from tall oil tend to form emulsions which are hard to break in the ordinary processes of making such separations. Moreover, in such process, objectionable impurities from the tall oil are incorporated in the insoluble ester-resin acid complex, and their removal is a difficult and relatively costly operation.

Among the objects of this invention are to provide a practical, economical and easy means of treating crude tall oil (1) to recover the fatty acids as clear, pure light-colored products substantially free from objectionable odorous components and thus suitable for many of the uses to which high grade fatty acids are put, such as for instance domestic laundry soaps; (2) to recover rosin or resin acids substantially free from odor and/or carbonized residues.

Another object is to provide a chemical process for yielding from tall oil the relatively refined products noted, in which process the reagent used is itself a raw or unrefined product of low cost, the impurities of which tend to bring about the desired refining action.

Another object is to provide a process of the character and for the purpose noted in which the raw and inexpensive reagent used does itself undergo partial refinement as an incident to carrying out the process.

Another object is to provide a process of the above type in which the treated liquid is inherently unemulsified so that the difficulties of separation due to emulsification are avoided.

The selective esterification principle is utilized according to the present invention in conjunction with further reagents which lead to removal in the residual solvent remaining after esterification, of the objectionable impurities of the tall oil either as such or as reaction products of such impurities, so that the yield of ester-resin-acid complex is relatively free from such impurities.

Instead of using the methyl or ethyl alcohol in the refined form, which alone has heretofore been at all feasible for commercial utilization, I utilize according to the present invention the article known commercially as crude wood spirits or crude wood alcohol, such as is commonly produced in the wood distillation industry, and marketed as crude 82% wood alcohol. Such alcohol will vary in composition with the source but will consist essentially of methanol admixed with methyl acetate, methyl and other ketones and a small amount of allyl alcohol and other unsaturated impurities. Esterification with such crude alcohol results in an ester-resin-acid complex free from objectionable impurities, whether from the tall oil or from the wood alcohol, the impurities from both sources remaining with the residual solvent excess.

In the use of such crude material, not only is the esterifying alcohol supplied from what is probably the cheapest source, but the necessary solvent excess is in a form from which the ester-resin-acid complex can be readily and quantitatively separated by physical means as by mere difference in gravity. This is due to the fact that although both the original tall oil and the methyl esters, are soluble in either pure methyl alcohol or in crude wood alcohol, the mixture of methyl esters and resin acids obtained by esterification of tall oil is insoluble in the residual solvent remaining after esterification with crude wood alcohol.

Furthermore, I have found that by combining the esterification process with a treatment with formaldehyde, purification of both the tall oil and the wood alcohol is possible simultaneously with the esterification. This is due to the fact that the objectionable impurities in both tall oil and crude alcohol are apparently of the class of unsaturated compounds which react with reagents of the formaldehyde class and remain soluble in the residual solvent.

Thus the residual solvent excess exerts a selective solvent action. The ester-resin-acid complex, which is insoluble, separates therefrom substantially free from impurities and yields a product from which substantially pure, clean esters, fatty acids and rosin acids can easily be obtained by fractional distillation. The impurities remain in the residual solvent layer and the latter can be separately treated for the removal of the impurities and the recovery of pure solvent fractions.

As an illustrative example of one convenient and generally effective practical application of my process 200 pounds of crude tall oil are dissolved in 50 gallons of crude 82% wood alcohol; 25 pounds commercial concentrated hydrochloric acid and 10 pounds formalin (40% formaldehyde solution) are then added, with stirring, and the whole heated under reflux for six to eight hours. During this time the mass is kept agitated, e. g. by stirring or by means of a circulating pump. When reaction is complete, 10 gallons water are added and the mass is allowed to settle. It will separate into two layers; the upper, or aqueous layer will consist essentially of diluted excess solvent and will also contain most of the hydrochloric acid used in the esterification as well as the reaction products of the objectionable impurities from both the tall oil and the crude alcohol; the lower, oily layer, will consist of the ester-resin-acid complex.

The oily layer is withdrawn, 15 gallons of water are added with agitation, and the mass is allowed to settle. Upon standing, the oily layer will now rise to the top. The wash liquor is withdrawn and washing of the oily layer is repeated with another 15 gallon portion of water. Both wash liquors are combined with the main aqueous solvent layer, to be worked up as indicated below, while the oil layer is washed with further portions of water, all of which may now be discarded, until the washings are free from mineral acid (Congo paper test). The oil may be dried, as by sodium sulfate, or the last traces of water may be removed mechanically. About 190–200 pounds dry oil will be recovered.

This oil, on distillation at about 10 mm. pressure, will yield about 90 to 100 pounds of pale yellow oil boiling between 190–215° C. (at 10 mm. pressure) and also an equal amount of still residue which is essentially rosin and non-saponifiables. Both can be further purified, as desired. For example, the mixture of esters may be subjected to a redistillation under vacuum, and at 10 mm. pressure will yield approximately 15% oil boiling between 180–200° C., 75% boiling between 200–205° C., and practically all of the remainder boiling between 205–215° C. A small amount of solid rosin will, of course, remain as still residue after the fractional distillation set forth.

The solvent layer, including the 40 gallons of wash liquor from the first three washings, can be treated to recover an amount of purified solvent equal to about 80–85% of the solvent originally used, depending on the composition of the latter. The composition of the original crude alcohol will determine the composition of the recovered solvent but in all cases such recovered solvent will be a partially refined product. The latter may be further purified as desired by any suitable method.

My invention is not limited to the specific example above set forth, nor to the specific conditions, herein described. The relative amounts of tall oil, crude wood alcohol and other reactants may vary within wide limits; the methods of esterification, the pressures and times of reaction are all variables which do not affect the fundamentals of the invention. Nor do I wish to limit myself to formaldehyde, as equivalent aldehydes can be used advantageously. Also it will be obvious to any skilled chemist that the use of synthetic mixtures of pure methanol and solvents similar to those present in crude wood alcohol, would fall within the scope of the present invention.

Having thus described my invention, what I claim as new and desire to secure by Letters Patent is:

1. The process of recovering refined products from tall oil, which comprises the selective esterification of the fatty ingredients thereof with a mixed solvent marketed commercially as crude wood alcohol in the presence of a mineral acid and an aldehyde and then separating the resultant insoluble ester-resin-acid complex from the residual solvent.

2. The process of recovering refined products from tall oil, comprising the selective esterification of the fatty acid ingredients of tall oil with crude wood alcohol in the presence of an esterifying catalyst and an aldehyde, separating the specifically heavier mixed ester-resin-acid complex from the specifically lighter residual solvent and subjecting the said ester-resin-acid complex to fractional distillation under reduced pressures.

3. The process of recovering refined products from tall oil comprising the selective esterification of the fatty ingredient thereof with crude wood alcohol in the presence of hydrochloric acid and formaldehyde, separating the heavier ester-resin-acid complex from the lighter residual solvent, and further separating the said ester-resin-acid complex into esters and resin acid by subjecting the same to fractional distillation under reduced pressures.

4. The process of simultaneously deriving relatively pure chemicals from tall oil and crude wood alcohol by esterifying the fatty acids of the former with the latter in the presence of an esterifying catalyst, and adding an aldehyde, which latter promotes the separation of objectionable impurities from the resultant insoluble esterified yield of said crude products by rendering such impurities soluble in the residual solvent and then separating said esterified yield and said impurities from such residual solvent.

5. The process which comprises the selective esterification of the fatty acids of tall oil in a solvent excess consisting essentially of methanol and including the other ingredients commonly present in crude wood alcohol, in the presence of an esterifying catalyst and upon completion of the resultant reaction adding water to bring about the separation into a lower oily layer consisting essentially of ester-resin-acid complex and an upper aqueous layer containing the ingredients other than the ester-resin-acid complex and then separating the layers and subjecting them to treatment for purification thereof.

ISADOR MILLER.